Figures 1, 2:
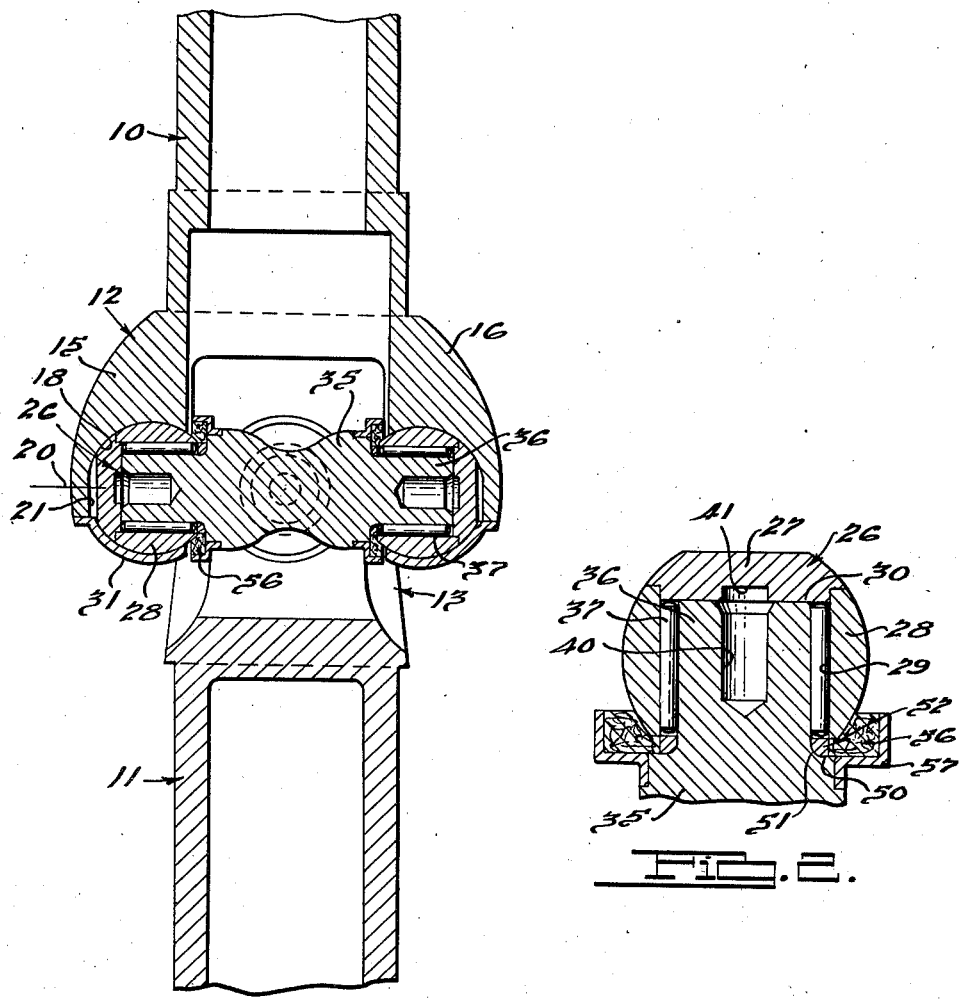

Jan. 20, 1942.   G. E. DUNN   2,270,281
UNIVERSAL JOINT
Original Filed Aug. 17, 1940

INVENTOR
George E. Dunn.
BY
Harness, Dickey & Pierce
ATTORNEYS.

Patented Jan. 20, 1942

2,270,281

UNITED STATES PATENT OFFICE 2,270,281

UNIVERSAL JOINT

George E. Dunn, Dearborn, Mich., assignor to Universal Products Company Incorporated, Dearborn, Mich., a corporation of Delaware Original application August 17, 1940, Serial No. 353,016. Divided and this application May 26, 1941, Serial No. 395,213

7 Claims. (Cl. 64—17)

The invention relates generally to universal joints and it has particular relation to a bearing assembly forming part of the joint.

The application constitutes a division of my copending application for patent, Serial No. 353,016, filed August 17, 1940.

One object of the invention is to provide an improved universal joint of such character that the size and weight of the joint may be reduced.

Another object of the invention is to provide an improved universal joint having an improved ball member of such character that the overall size of the joint can be reduced and that manufacturing operations employed in making the ball member can be simplified.

Other objects of the invention will become apparent from the following specification, from the drawing relating thereto, and from the claims hereinafter set forth.

For a better understanding of the invention, reference may be had to the drawing, wherein:

Figure 1 is an elevational view of a universal joint as constructed according to one form of the invention; and Fig. 2 is a detail view in cross-section illustrating the bearing assembly on a larger scale.

Referring to Figure 1, the universal joint illustrated includes a pair of hub members 10 and 11 terminating in yokes 12 and 13, respectively, and the hubs are adapted to be connected to driving and driven shafts, respectively, as will be readily understood. Each of the yokes 12 and 13 has diametrically opposed arms 15 and 16 and the arms of one yoke are disposed between and in 90° spaced relation to the arms of the other yoke.

Each of the arms 15 and 16 has a ball seating socket or recess 18 which is of spherical contour substantially to the radial center plane of the joint indicated at 20 and beyond this plane and between it and the free end of each arm, the socket is cylindrical in character as indicated at 21. It follows that the first part of the socket is cylindrical and then inwardly thereof the socket is of spherical character, and it is to be understood that the radii of both parts of the socket are the same. It might be observed that the spherical part 18 is of semi-spherical character and that the center of the spherical surface lies in the plane 20.

Each of the sockets in the yoke arms receives a ball member 26, as best shown by Fig. 2, which comprises two frusto spherical parts 27 and 28. The spherical part 28 has a diametrical bore 29 extending entirely therethrough while the spherical part 27 has a portion 30 projecting slightly into the outer end of the bore 29 and fitting closely therein. The parts 27 and 28 may be held together by having the portion 30 press fitted in the bore 29 sufficiently tight to seal the bore against leakage of lubricant although under certain conditions it may be found desirable to fasten the parts 27 and 28 together by brazing or by welding. While the parts may be held together by any of the aforesaid means, it should be observed that there is no danger of separation of the parts after assembly of the joint because the ball recess embraces the ball member 27 outwardly of the ball center. It might be added here that a cap 31 holds the ball in the recess and that this cap also embraces the member 27.

A cross 35 having four trunnions, each indicated at 36, interconnects the two yokes, and the trunnions, respectively, project into the bores 29 of the ball members. Roller bearings 37 are disposed around each trunnion 36 and between it and the surface of the bore 29 and these rollers are substantially as long as the distance between the inner end of the ball member 28 and the base surface of the projecting part 30 of the ball member 27. Recesses 40 and 41 provided in the end of the trunnion and in the inner side of the ball member 27, provide a reservoir for lubricant, and lubricant is distributed throughout the bearing and particularly between the rollers. The member 27 serves as a thrust bearing member for engaging and centering the trunnion and cross and since the outer parts of both members 27 and 28 contact with the outer parts of the socket, the ball members are centered with respect to the joint axis.

It may be added that each trunnion has a shoulder or base portion 50 joining the trunnion surface proper by means of a rounded corner 51 and between the ends of the rollers 37 and such shoulder, a relatively hard metal washer 52 is provided. This washer prevents the rollers from moving inwardly and engaging the rounded corner 51 and thus allows rounding of the corner to obtain strength of cross. The space between the inner ends of the ball members at the base of the trunnion is sealed by means of a sealing ring 66 which is retained against the spherical member 28 by means of a ferrule 57.

In the copending application for patent previously identified, it has been pointed out in greater detail that the size of the joint may be reduced by several factors and that a principal factor involves the use of self-aligning ball elements which vary their positions in the sockets to maintain alignment with the trunnions. From this it follows that the cylindrical rollers may have full roller bearing contact both with the trunnion surface and the inner surface of the bore 29 so that under greater torque loads, the bearing may have the desired bearing contact. Full roller bearing contact enables the joint to take a greater torque load and thus a smaller joint can actually be constructed than heretofore used wherein under ordinary torque conditions the rollers did not maintain full bearing contact. Additionally, rollers of smaller diameter may be used, and the diameter of the trunnions may be increased. Thus, a stronger trunnion actually smaller in overall diameter may be employed.

Making the ball in two parts is distinctly advantageous too because the bore 29 may be formed in the part 28 and without interference before the part 27 is added and it is unnecessary to have a relief groove such as would be necessary if the bore were formed in a solid ball. With given ball size and wall thickness, a longer roller contacting surface may thus be provided, and actually the net result is that a smaller ball and smaller rollers may be employed while still obtaining desired bearing surface and bearing contact. Thus, this structure is an additive factor in reducing the size of the joint, since it enables using a smaller ball while still obtaining the desired length of bearing contact. Hence, the yokes, and other parts fitting the balls, may be reduced in size and overall diameter.

Although more than one form of the invention has been described and illustrated in detail, it will be apparent to those skilled in the art that various modifications may be made without departing from the scope of the appended claims.

What is claimed is:

1. In a universal joint of the four trunnion type, a trunnion bearing assembly comprising a member having a recess, a trunnion projecting into the recess, a ball member in the recess and having a diametrically extending bore receiving the trunnion, and rollers within said bore and around the trunnion, said ball member comprising two separate, complemental frusto-spherical parts, one part having said bore extending entirely therethrough and the other constituting a closing wall for the end of the bore at the outer end face of the trunnion.

2. In a universal joint of the four trunnion type, a trunnion bearing assembly comprising a member having a recess, a trunnion projecting into the recess, a ball member in the recess and having a diametrically extending bore receiving the trunnion, and rollers within said bore and around the trunnion, said ball member comprising two separate, complemental frusto-spherical parts, one part having said bore extending entirely therethrough and the other part constituting a closing wall for the end of the bore at the outer end face of the trunnion and having a portion fitting within said end of the bore.

3. In a universal joint of the four trunnion type, a trunnion bearing assembly comprising a member having a recess, a trunnion projecting into the recess, a ball member in the recess and having a diametrically extending bore receiving the trunnion, and rollers within said bore and around the trunnion, said ball member comprising two separate, complemental frusto-spherical parts, one part having said bore extending entirely therethrough and the other part constituting a closing wall for the end of the bore at the outer end face of the trunnion and having a portion projecting thereinto and which has a press fit in said end of the bore.

4. In a universal joint of the four trunnion type, a trunnion bearing assembly comprising a member having a recess, a trunnion projecting into the recess, a ball member in the recess and having a diametrically extending bore receiving the trunnion, rollers within said bore and around the trunnion, said ball member comprising two separate complemental frusto-spherical parts, one having said bore extending entirely therethrough and the other constituting a closing wall for the end of the bore at the outer end face of the trunnion, and means holding the two parts assembled, said first mentioned member having operative engagement with the ball for centering it relative to the joint axis.

5. In a universal joint of the four trunnion type, a trunnion bearing assembly comprising a member having a recess, a trunnion projecting into the recess, a ball member in the recess and having a diametrically extending bore receiving the trunnion, rollers within said bore and around the trunnion, said ball member comprising two separate complemental frusto-spherical parts, one having said bore extending entirely therethrough and the other constituting a closing wall for the end of the bore at the outer end face of the trunnion, and having a portion projecting thereinto and which has a press fit in said end of the bore, said first mentioned member having operative engagement with the ball for centering it relative to the joint axis.

6. For use in a universal joint, a ball member comprising two separate, complemental frusto-spherical parts having outer complemental frusto-spherical surfaces, one having a diametrically extending bore entirely therethrough, and the other being secured to the first part and constituting a closing wall for one end of the bore.

7. For use in a universal joint, a ball member comprising two separate, complemental frusto-spherical parts having outer complemental frusto-spherical surfaces, one having a diametrically extending bore entirely therethrough, and the other part constituting a wall for one end of the bore and having an inner portion fitting within said end of the bore.

GEORGE E. DUNN.